(12) United States Patent
Bonnat

(10) Patent No.: US 9,116,544 B2
(45) Date of Patent: Aug. 25, 2015

(54) METHOD AND SYSTEM FOR INTERFACING WITH AN ELECTRONIC DEVICE VIA RESPIRATORY AND/OR TACTUAL INPUT

(76) Inventor: Pierre Bonnat, Las Vegas, NV (US)

( * ) Notice: Subject to any disclaimer, the term of this patent is extended or adjusted under 35 U.S.C. 154(b) by 1080 days.

(21) Appl. No.: 12/056,061

(22) Filed: Mar. 26, 2008

(65) Prior Publication Data
US 2009/0244003 A1 Oct. 1, 2009

(51) Int. Cl.
| | |
|---|---|
| G06F 3/033 | (2013.01) |
| G09G 5/08 | (2006.01) |
| G06F 3/01 | (2006.01) |
| G06F 3/0482 | (2013.01) |
| G06F 3/0485 | (2013.01) |
| G06F 3/0488 | (2013.01) |

(52) U.S. Cl.
CPC .............. *G06F 3/011* (2013.01); *G06F 3/0482* (2013.01); *G06F 3/0485* (2013.01); *G06F 3/04883* (2013.01); *G06F 2203/04803* (2013.01)

(58) Field of Classification Search
CPC ..... G06F 3/011; G06F 3/0482; G06F 3/0485; G06F 3/04883; G06F 2203/04803
USPC .......... 345/156–184; 715/700, 727–729, 831, 715/865
See application file for complete search history.

(56) References Cited

U.S. PATENT DOCUMENTS

| | | |
|---|---|---|
| 4,207,959 A | 6/1980 | Youdin et al. |
| 4,433,685 A | 2/1984 | Giorgini et al. |
| 4,521,772 A | 6/1985 | Lyon |
| 4,561,309 A | 12/1985 | Rosner |
| 4,713,540 A | 12/1987 | Gilby et al. |
| 4,746,913 A | 5/1988 | Volta |
| 4,929,826 A | 5/1990 | Truchsess et al. |
| 5,341,133 A | 8/1994 | Savoy et al. |
| 5,378,850 A | 1/1995 | Tumura |
| 5,422,640 A | 6/1995 | Haley |

(Continued)

FOREIGN PATENT DOCUMENTS

| | | |
|---|---|---|
| JP | 10320108 | 12/1998 |
| WO | WO 2008/030976 | 3/2008 |

OTHER PUBLICATIONS

International Bureau, International Preliminary Report on Patentability (Chapter I of the PCT), Patent Application Serial No. PCT/US2009/038384, mailed Oct. 7, 2010.

(Continued)

*Primary Examiner* — Charles V Hicks
(74) *Attorney, Agent, or Firm* — McAndrews, Held & Malloy, Ltd.

(57) ABSTRACT

Aspects of a method and system for interfacing with an electronic device via respiratory and/or tactual input are provided. In this regard, respiratory and tactual input may be utilized to interact with an electronic device via a user interface. The user interface may comprise a control region that may enable navigating and selecting objects, a fixed region that may enable display of information that may be independent of a state of, or activity in, the control region, and a content region that may enable display of information that may depend on a state of, or activity in, the control region. Accordingly, objects and/or information displayed on the electronic device may be affected and/or manipulated via tactual and respiratory input. Additionally, each region of the user interface may comprise one or more zones and a size, shape, and/or location of each region may be customized by a user.

38 Claims, 15 Drawing Sheets

(56) References Cited

U.S. PATENT DOCUMENTS

| | | |
|---|---|---|
| 5,603,065 A | 2/1997 | Baneth |
| 5,740,801 A | 4/1998 | Branson |
| 5,763,792 A | 6/1998 | Kullik |
| 5,835,077 A | 11/1998 | Dao |
| 5,889,511 A | 3/1999 | Ong et al. |
| 5,907,318 A | 5/1999 | Medina |
| 6,040,821 A | 3/2000 | Franz |
| 6,213,955 B1 | 4/2001 | Karakasoglu et al. |
| 6,229,524 B1 * | 5/2001 | Chernock et al. ............ 345/157 |
| 6,261,238 B1 | 7/2001 | Gavriely |
| 6,323,846 B1 | 11/2001 | Westerman |
| 6,396,402 B1 | 5/2002 | Berger et al. |
| 6,421,617 B2 | 7/2002 | Felsenstein |
| 6,516,671 B2 | 2/2003 | Romo et al. |
| 6,574,571 B1 | 6/2003 | Bonnat |
| 6,664,786 B2 | 12/2003 | Kretschmann |
| 7,053,456 B2 | 5/2006 | Matsuo |
| 7,398,474 B2 | 7/2008 | Yan et al. |
| 7,418,472 B2 | 8/2008 | Shoemaker et al. |
| 7,631,267 B2 | 12/2009 | Viji et al. |
| 7,689,908 B2 | 3/2010 | Yan et al. |
| 7,735,021 B2 | 6/2010 | Padawer et al. |
| 7,895,530 B2 | 2/2011 | Leavitt et al. |
| 2003/0208334 A1 | 11/2003 | Bonnat |
| 2004/0017351 A1 * | 1/2004 | Bonnat ........................ 345/156 |
| 2005/0127154 A1 | 6/2005 | Bonnat |
| 2005/0268247 A1 | 12/2005 | Baneth |
| 2006/0118115 A1 | 6/2006 | Cannon |
| 2006/0142957 A1 | 6/2006 | Bonnat |
| 2006/0288300 A1 | 12/2006 | Chambers et al. |
| 2007/0048181 A1 | 3/2007 | Chang et al. |
| 2007/0101297 A1 | 5/2007 | Forstall et al. |
| 2007/0150816 A1 | 6/2007 | Hariki |
| 2008/0122796 A1 * | 5/2008 | Jobs et al. ..................... 345/173 |
| 2008/0215240 A1 | 9/2008 | Howard et al. |
| 2009/0140978 A1 * | 6/2009 | Louch .......................... 345/157 |
| 2009/0164928 A1 | 6/2009 | Brown et al. |
| 2009/0178006 A1 | 7/2009 | Lemay et al. |

OTHER PUBLICATIONS

International Search Report and Written Opinion for International Patent Application Serial No. PCT/US09/38397, mailed May 26, 2009.

International Search Report and Written Opinion for International Patent Application Serial No. PCT/US09/038395, mailed May 27, 2009.

International Search Report and Written Opinion for International Patent Application Serial No. PCT/US2009/038384, mailed Jun. 10, 2009.

European Patent Office, International Search Report, in PCT/US03/32203, dated Aug. 24, 2005.

European Patent Office, Preliminary Examination Report, in PCT/US03/32203, dated Mar. 29, 2006.

United States Patent and Trademark Office, Office Action, in U.S. Appl. No. 10/530,946, dated Oct. 5, 2007.

Japanese Patent Office, Notice of Reason for Rejection in Patent application No. 2011-502051, dated Feb. 20, 2013. (3 pages).

Zenji Nishikawa, [Report]. SIGGRAPH2006, "Emerging Technologies", [online] Aug. 6, 2006, retrieved on Feb. 14, 2013, at http://news.mynavi.jp/articles/2006/08/06/siggraph03/003.html. (2 pages).

* cited by examiner

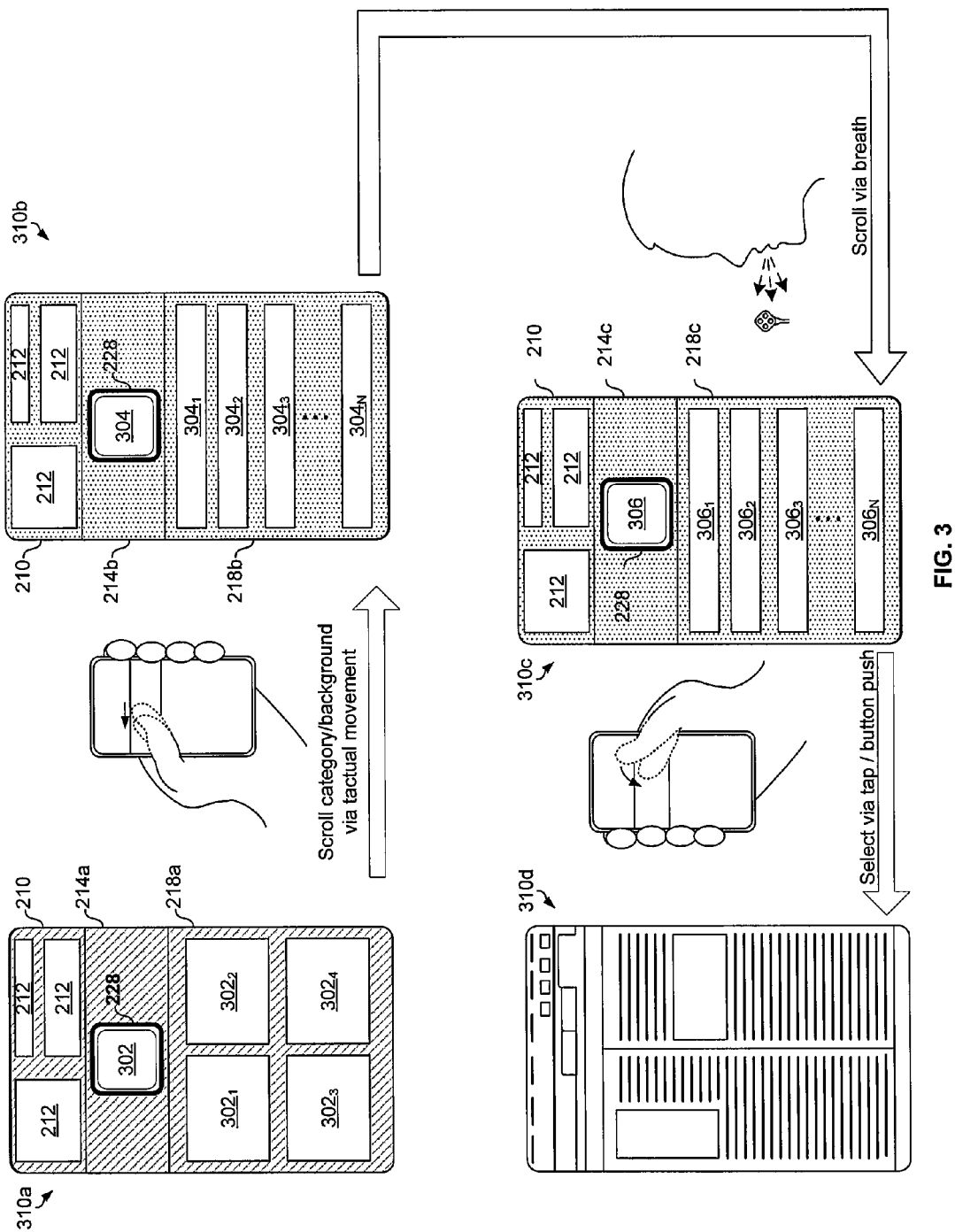

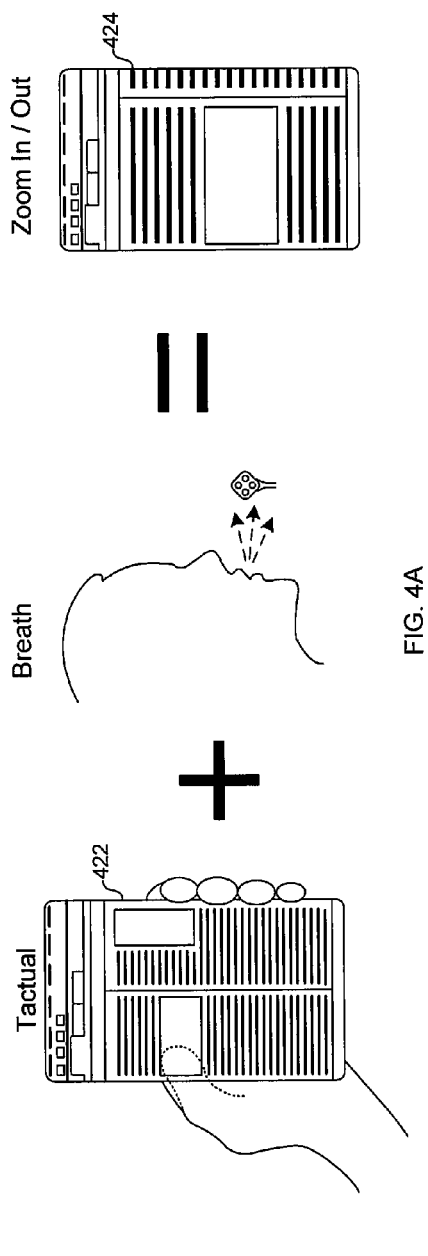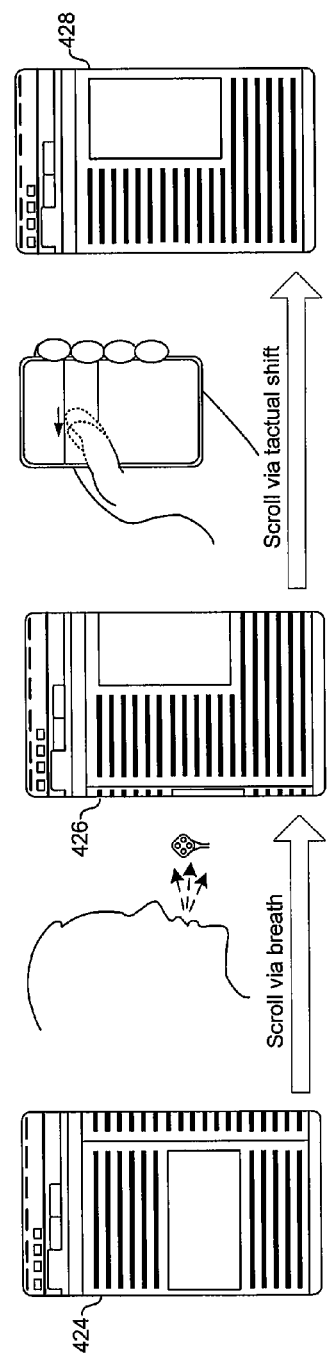
FIG. 4A
FIG. 4B

METHOD AND SYSTEM FOR INTERFACING WITH AN ELECTRONIC DEVICE VIA RESPIRATORY AND/OR TACTUAL INPUT

CROSS-REFERENCE TO RELATED APPLICATIONS/INCORPORATION BY REFERENCE

This application makes reference to:

U.S. application Ser. No. 12/056,164 filed on Mar. 26, 2008, now issued as U.S. Pat. No. 7,739,061;

U.S. application Ser. No. 12/055,999 filed on Mar. 26, 2008, now published as U.S. Patent Application Publication No. 2009/0241686;

U.S. application Ser. No. 12/056,203 filed on Mar. 26, 2008, now published as U.S. Patent Application Publication No. 2009/0082884;

U.S. application Ser. No. 12/056,171 filed on Mar. 26, 2008, now published as U.S. Patent Application Publication No. 2009/0249202; AND U.S. application Ser. No. 12/056,187 filed on, now published as U.S. Patent Application Publication Ser. No. 2009/0247222.

Each of the above stated application is hereby incorporated herein by reference in its entirety.

FIELD OF THE INVENTION

Certain embodiments of the invention relate to system control. More specifically, certain embodiments of the invention relate to a method and system for interfacing with an electronic device via respiratory and/or tactual input.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology.

While voice connections fulfill the basic need to communicate, and mobile voice connections continue to filter even further into the fabric of every day life, the mobile access to services via the Internet has become the next step in the mobile communication revolution. Currently, most mobile devices are equipped with a user interface that allows users to access the services provided via the Internet. For example, some mobile devices may have browsers, and software and/or hardware buttons may be provided to enable navigation and/or control of the user interface. Some mobile devices such as Smartphones are equipped with touch screen capability that allows users to navigate or control the user interface via touching with one hand while the device is held in another hand.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for interfacing with an electronic device via respiratory and/or tactual input, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 illustrates launching an application via a user interface utilizing respiratory and tactual input, in accordance with an embodiment of the invention.

FIG. 4A illustrates exemplary interaction with an application running on a electronic device, in accordance with an embodiment of the invention.

FIG. 4B illustrates exemplary interaction with an application running on a electronic device, in accordance with an embodiment of the invention.

DETAILED DESCRIPTION OF THE INVENTION

Certain embodiments of the invention may be found in a method and system for interfacing with an electronic device via respiratory and/or tactual input. In this regard, respiratory and tactual input may be utilized to interact with an electronic device. The user interface may comprise one or more of a control region, a fixed region, and a content region. The control region may enable display, navigation, and/or selection of objects of user interface via the respiratory and tactual input. The fixed region may enable display of information that may be independent of a state of, or activity in, the control region. The content region may enable display of information that may depend on a state of, or activity in, the control region. Each region of the user interface may comprise one or more zones and a size, shape, and/or location of each region may be customized and/or based on application(s) and/or function(s) being utilized on the electronic device. Objects displayed in the content region 218 may be scrolled into the control region via respiratory input. The objects navigated and/or selected via the control zone may be grouped into categories and each category may be associated with a background image. A user may utilize tactual input to scroll though the categories and may utilize respiratory input to scroll through the objects grouped into a particular category. Information displayed on the electronic device may be scrolled via respiratory input and scrolled via tactual input. Additionally, information displayed on the electronic device may be enlarged and/or shrunk by utilizing tactual input to control a reference point for the enlarging and/or shrinking and utilizing respiratory input to control an amount by which to enlarge and/or shrink the information. In various embodiments of the invention, the electronic device may comprise one or more of a cellular telephone, a smartphone, a wireless telephone, a notebook computer, a personal media player, a personal digital assistant, a multimedia device, a handheld device and/or a multi-function mobile device.

Figure 1:
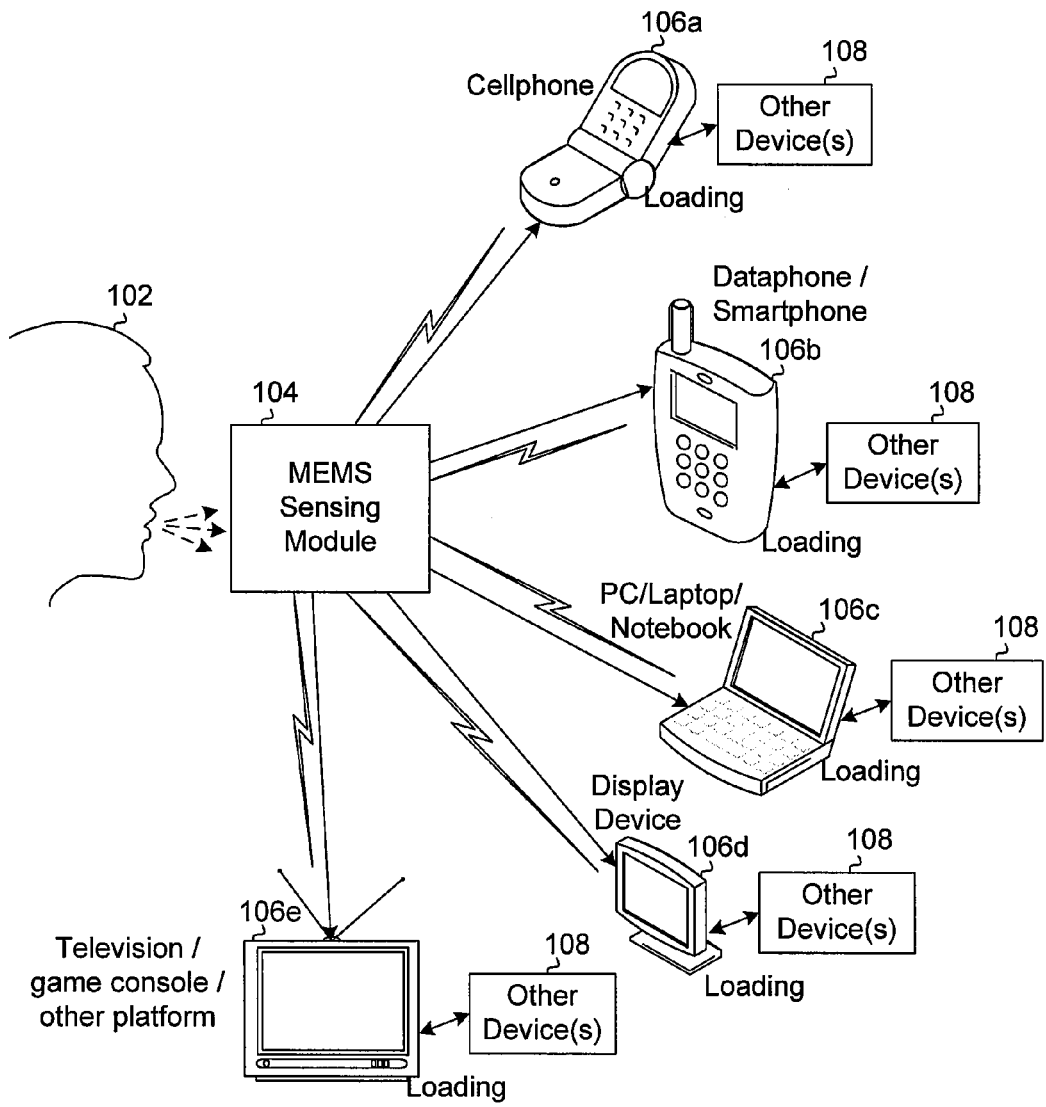
FIG. 1 is a block diagram of an exemplary system for interfacing with a electronic device via human respiration, in accordance with an embodiment of the invention.

FIG. 1 is a block diagram of an exemplary system for interfacing with a electronic device via human respiration, in accordance with an embodiment of the invention. Referring to FIG. 1A, there is shown a user 102, a micro-electro-mechanical system (MEMS) sensing module 104, and a plurality of electronic devices, collectively referred to herein as electronic devices 106, with which the user may interface via respiratory actions. Exemplary electronic devices may comprise a cellphone 106a, a smartphone/dataphone 106b, a personal computer (PC), laptop or a notebook computer 106c, a display device 106d and/or a television/game console/other platform 106e. Each of the plurality of electronic devices 106 may be wired or wirelessly connected to a plurality of other devices 108 for loading of information and/or communication of information.

The MEMS sensing module 104 may be enabled to detect movement caused by respiratory actions, such as inhalations and exhalations, of the user 102. In response to the detection of movement caused by respiratory actions, the MEMS sensing module 104 may be enabled to generate one or more control signals, referred to herein (where applicable) as respiratory input. The respiratory input comprising one or more control signals may be communicatively coupled to an electronic device 106 to effect a response in the electronic device. In this regard, respiratory action may provide input to an electronic device 106 in a manner similar to conventional input devices such as a mouse, trackball, keyboard, or microphone.

In accordance with an embodiment of the invention, the detection of the movement caused by respiratory action may occur without use of a channel. The detection of the movement caused by respiratory action may be responsive to the respiratory action into open space and onto a detection device, such as the MEMS module 104, which enables the detection.

In accordance with another embodiment of the invention, the MEMS sensing module 104 may be enabled to navigate within the user interface of one of more of the electronic devices 106, via the generated one or more control signals. The MEMS sensing module 104 may be enabled to scroll select, or otherwise manipulate and/or affect objects displayed on and/or outputs of the electronic devices 106. In this regard, the term "scroll" or "scrolling" herein may be synonymous with a variety of actions/interactions such as scrolling in any direction, tilting in any direction, panning in any direction, swiveling in any direction, and browsing in any direction. The generated one or more control signals may comprise one or more of a wired and/or a wireless signal. An exemplary MEMS sensing module may be found in incorporated U.S. application Ser. No. 12/055,999.

In accordance with another embodiment of the invention, one or more of the electronic devices 106, may be enabled to receive one or more inputs defining the user interface from another device 108. The other device 108 may be one or more of a PC, laptop or a notebook computer 106c and/or a handheld device, for example and without limitation, a cellphone 106a and/or a smartphone 106b. The MEMS sensing module 104 may be enabled to customize the user interface of one or more of the electronic devices 106 so that content associated with one or more received inputs may become an integral part of the user interface of the device being controlled.

Figure 2A:
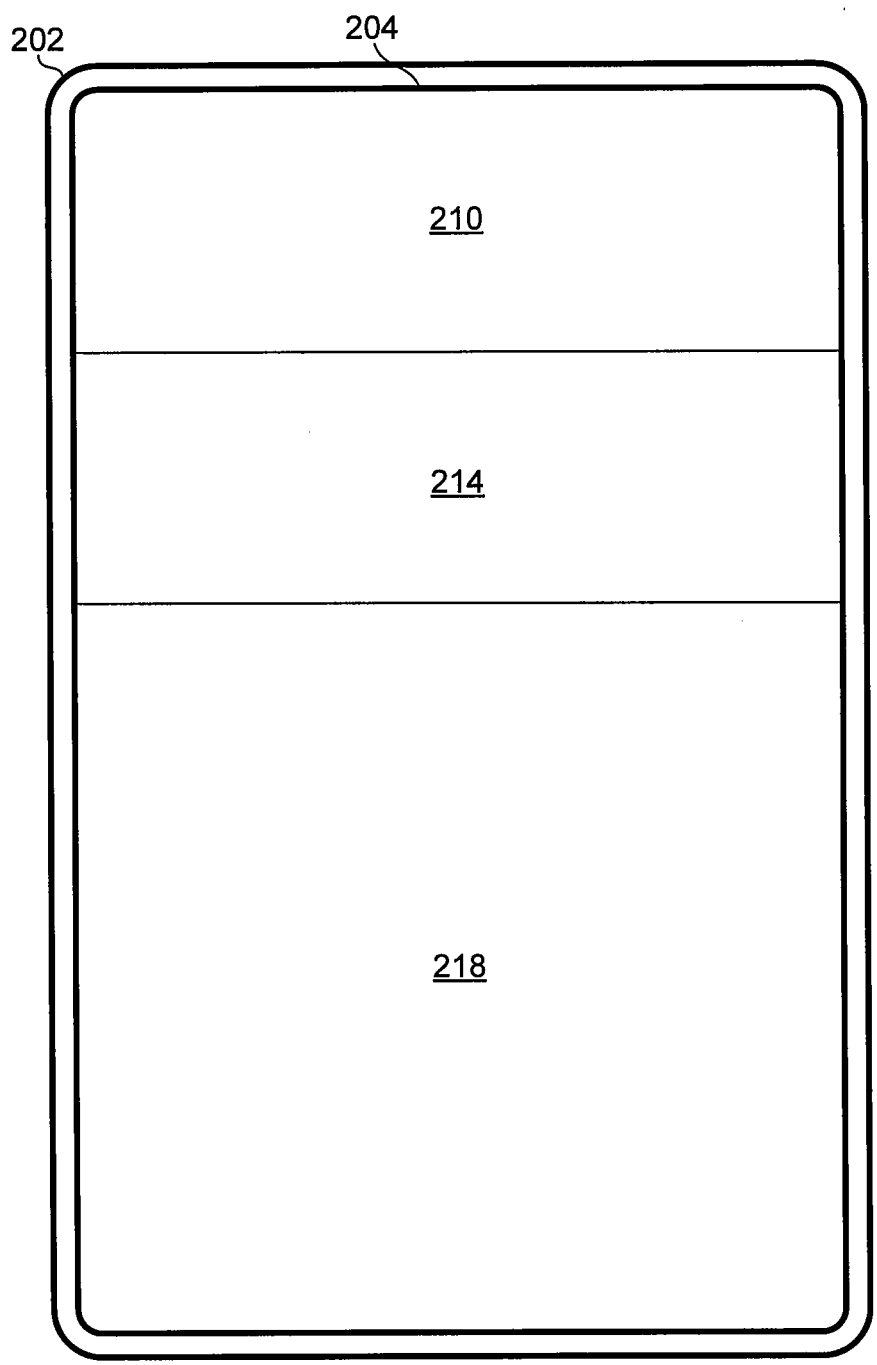
FIG. 2A is a diagram illustrating an exemplary electronic device that may be controlled via a sectional user interface, in accordance with an embodiment of the invention.

FIG. 2A is a diagram illustrating an exemplary electronic device that may be controlled via a sectional user interface, in accordance with an embodiment of the invention. Referring to FIG. 1, there is shown an electronic device 202 comprising a touchscreen display 204. In this regard, although a touchscreen display is utilized for illustration, the electronic device 202 may comprise a non-touchscreen display and one or more input devices such as a trackball, one or more multi-function buttons, and/or a keyboard, without deviating from the scope of the present invention.

The electronic device 202 may comprise a user interface, such as a graphical user interface (GUI), which may enable a user to navigate through and launch the various applications and/or functions on the electronic device 202. In this regard, the user interface may enable interacting with the electronic device via respiratory inputs such as exhalations, tactual inputs such as button presses, audio actions such as voice commands, and/or movements of the electronic device 202 such as those detected by an accelerometer and/or gyroscope. In this regard, the user interface may enable interacting with the electronic device 202 via any combination of one or more of the input methods. Furthermore, the user interface may be enabled to detect an error and/or failure of one or more input methods and default to one or more other input methods. In this manner, interacting with the user interface may not be critically impacted by the failure and/or absence of a particular input method.

The user interface of the electronic device 202 may display information about the status and/or capabilities of the electronic device 202 and/or display information and/or content generated by one or more applications on the electronic device 202. In various embodiments of the invention, upon powering on the electronic device 202, a homescreen of the user interface may be displayed or presented. In various embodiments of the invention, the electronic device 202 may comprise one or more of a cellular telephone, a Smartphone, a wireless telephone, a notebook computer, a personal media player, a personal digital assistant, a multimedia device, a handheld device and/or a multi-function mobile device.

Figure 2B:
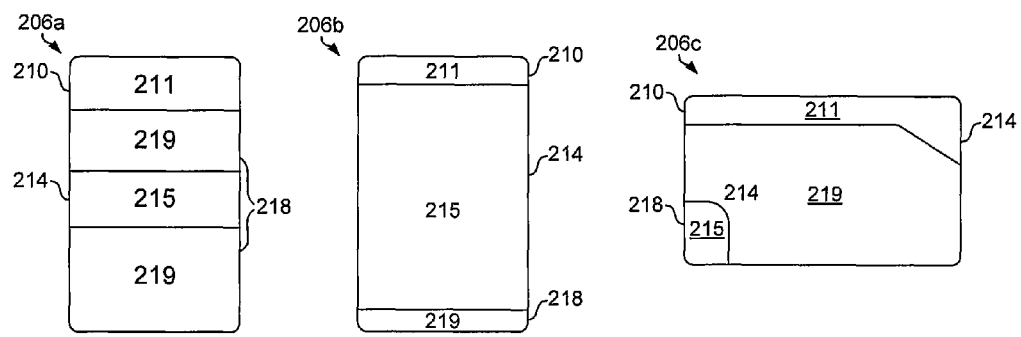
FIG. 2B is a diagram illustrating several exemplary configurations of a sectional user interface, in accordance with an embodiment of the invention.

The user interface may be sectioned into one or more of a fixed region 210 comprising one or more fixed zones 211, a control region 214 comprising one or more control zones 215, and a content region 218 comprising one or more content zones 219. In this regard, each of the regions 210, 214, and 218, when present, may be of any size and/or shape and may be in any location(s) of the display 204. Moreover, the presence, size, shape, and location(s) of the regions 210, 214, and 220 may be configured (i.e., personalize or customize) by a user of the electronic device 202. For example, the electronic device 202 may comprise a user interface customization application which a user may run to configure the regions of the user interface based on preferences such as whether the user is right handed or left handed. In this regard, exemplary configurations 206a, 206b, and 206c of the user interface are illustrated in FIG. 2B.

Figure 2C:
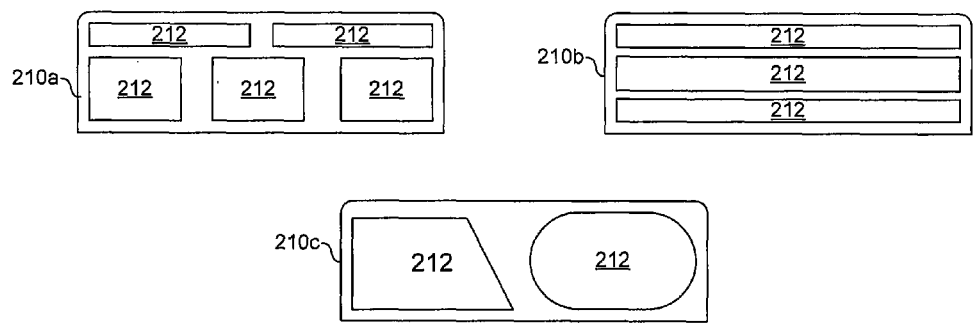
FIG. 2C is a diagram illustrating several exemplary fixed regions of a sectional user interface, in accordance with an embodiment of the invention.

The fixed region 210 may display information independent of a state of and/or activity in the control region 214. Exemplary information that may be displayed in the fixed region 210 may comprise the day, the time, weather, appointments in a calendar, RSS (or XML, or other markup language) feeds, recent email contacts, and/or recent phone contacts. However, the preceding are just examples of information that may be displayed in the fixed region 210 and the invention may not be so limited. Additionally, the size, shape and/or location of the fixed region 210 may change depending on what functions and/or applications are running on the electronic device 202. Furthermore, the type and/or amount of information displayed in the fixed region 210 may be customized by a user of the electronic device 202. In this regard, FIG. 2C illustrates some exemplary fixed regions 210a, 210b, and 210c.

The control region 214 may enable controlling the electronic device 202 such that desired information may be displayed and/or desired applications and/or functions may be launched on the electronic device 202. In this regard, respiratory and/or tactual input may be utilized to scroll, select, manipulate, or otherwise affect objects, such as text, images, links, and/or icons, of the user interface. In this regard, additional details of interacting with objects of the user interface utilizing respiratory and tactual input are described below with respect to FIG. 2E. Additionally, the type and/or amount of information displayed in the control region 214 may be customized by a user of the electronic device 202. Furthermore, the size, shape and/or location of the control region 214 may change depending on what functions and/or applications are running on the electronic device 202.

Figure 2D:
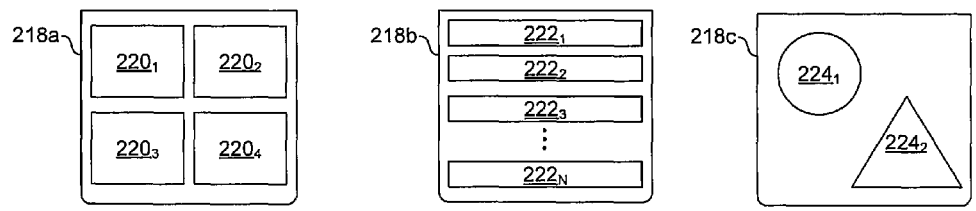
FIG. 2D is a diagram illustrating several exemplary content regions of a sectional user interface, in accordance with an embodiment of the invention.

The content region 218 may display information that may depend on a state of and/or activity in the control region 214. For example, the information in the content region 218 may depend on an active icon in the control region. In this regard, an active icon may be an icon which has been navigated to (via breath and/or tactual input) but has not been selected via a "click" (e.g., a tap on a touch screen, a button press or a puff of air). In one exemplary embodiment of the invention, the active icon may be link to a website and the content region 218 may display RSS feeds from that website. In another exemplary embodiment of the invention, the active icon may be a shortcut to launch an email client and the content region 218 may display one or more recent email messages. In this regard, exemplary information displayed in the content region 218 may comprise RSS or XML feeds, images, a calendar, recent calls, recent texts, and/or recent emails. However, the preceding are just examples and the invention is not so limited. Additionally, the information displayed in the content region 218 may be customizable by a user of the electronic device 202. Furthermore, the size, shape and/or location of the content region 218 may change depending on what functions and/or applications are running on the electronic device 202. In this regard, FIG. 2D illustrates a few exemplary content regions 218a, 218b and 218c.

In various embodiments of the invention, the display 204 may be a touchscreen and the control region 214 may be responsive to a range of tactual inputs, as opposed to the fixed region 210 and/or the content region 218 which may have limited response to tactual inputs. For example, the control region 214 may be responsive to tactual movements, a number of touches, and/or duration of touches while the fixed region 210 and the content region 218 may be responsive to multiple touches (e.g., a double tap). In this manner, limiting the amount of the display 204 that may be allocated to the control region 214 may reduce the amount of area that a user needs to be able to reach in order to navigate and select icons, thus facilitating single-handed operation of the electronic device 202. Additionally, limiting the tactual responsiveness of the fixed region 210 and the content region 218 may reduce inadvertent actions and/or selections (i.e., inadvertent "clicks").

Information in the fixed region 210 and/or the content region 218 may be displayed in the form of one or more objects, such as images, text, links and/or icons. In various embodiments of the invention, objects in the fixed region 210 and/or the content region 218 may be selectable via tactual and/or respiratory input. However, the response of the fixed region 210 and/or the content region 218 may be limited, as described above, to prevent inadvertent clicks. Additionally, in various embodiments of the invention, objects in the content region 218 may be scrolled into the control region 214 such that they may become selectable. For example, respiratory input may be utilized to scroll objects from the content region 218 into the control region 214 such that the object may be selected via tactual input to the control region 210.

Thus, the sectional user interface of the electronic device 202 may be described as a universal content access manager (UCAM) which may provide advantages over traditional graphical user interfaces. One advantage may be that the configurability (i.e. customization or personalization) of the UCAM may greatly increase the utility and/or ease of use of the electronic device 202 over a similar device having a conventional graphical user interface. In this regard, objects in each section may be sequenced, juxtaposed, superimposed, overlaid, or otherwise positioned and/or organized such that a user may quickly access desired information, applications, and/or functions. Another advantage may be the ability to section the UCAM into one or more regions may greatly increase the utility and/or ease of use of the electronic device 202 over a similar device having a conventional graphical user interface. In this regard, portions of each region may be configured to be responsive or non-responsive to a variety of input types and may be configured to be active (e.g., updated in real-time) or passive (e.g., statically displayed until changed by a user) in terms of information and/or objects displayed therein. Another advantage of the UCAM may be its compatibility with a variety of platforms. In this regard, a user may load the UCAM onto a plurality of his electronic devices such that he may interact with all of his electronic devices in the same manner.

FIG. 2B is a diagram illustrating several exemplary configurations of a sectional user interface, in accordance with an embodiment of the invention. Referring to FIG. 2B, there is shown exemplary user interface configurations 206a, 206b, and 206c, each having a fixed region 210 comprising one or more fixed zones 211, a control region 214 comprising one or more control zones 215, and a content region 218 comprising one or more content zones 219. In this regard, the size, shape, and/or location of the fixed region 210, the control region 214, and the content region 218 may be configured based on user preferences and/or based on a function and/or application running on the electronic device 202.

FIG. 2C is a diagram illustrating several exemplary fixed regions of a sectional user interface, in accordance with an embodiment of the invention. Referring to FIG. 2C there is shown fixed regions 210a, 210b, and 210c. In this regard, each of the fixed regions 210a may comprise one or more objects 212. Additionally, the portion of the fixed region 210 allocated to each object 212 may be configured to be of any shape and/or size. Exemplary objects 212 may comprise text, images, links and/or icons which may correspond to the date, the time, weather information, appointments in a calendar, RSS or XML feeds, recent email contacts, and/or recent phone contacts.

FIG. 2D is a diagram illustrating several exemplary content regions of a sectional user interface, in accordance with an embodiment of the invention. In this regard, in various embodiments of the invention, a user may configure attributes of the content region 218 such as the number of objects displayed, the size of the objects displayed, and the order of objects displayed. For example, the content region 218 may be customized to have different attributes for each icon, each group of icons, and/or each user. Thus, to provide an indication of the types of information which may be displayed in the content region 218 as well as the customizability of the content region 218, exemplary content regions 218a, 218b, and 218c are depicted.

The content region 218a may correspond to an active icon which may, for example, be a folder or website comprising digital photographs. Consequently, the objects $220_1, \ldots, 220_4$ may correspond to the last four pictures uploaded to the folder or web site. The content region 218b may correspond to an active icon which may, for example, be a link to social networking website. Consequently, the objects $222_1, \ldots, 222_N$ may correspond to the last 'N' events which occurred on one or more profiles on the social networking site. In another example, the content region 218b may correspond to an active icon which may, for example, launch an email client and the objects $222_1, \ldots, 222_N$ may correspond to the last 'N' emails sent or received. The content region 218c may correspond to an active icon which may, for example, be a shortcut to launch a web browser. Consequently, the objects $224_1$ and $224_2$ may be links to favorite and/or recently visited web pages.

Figure 2E:
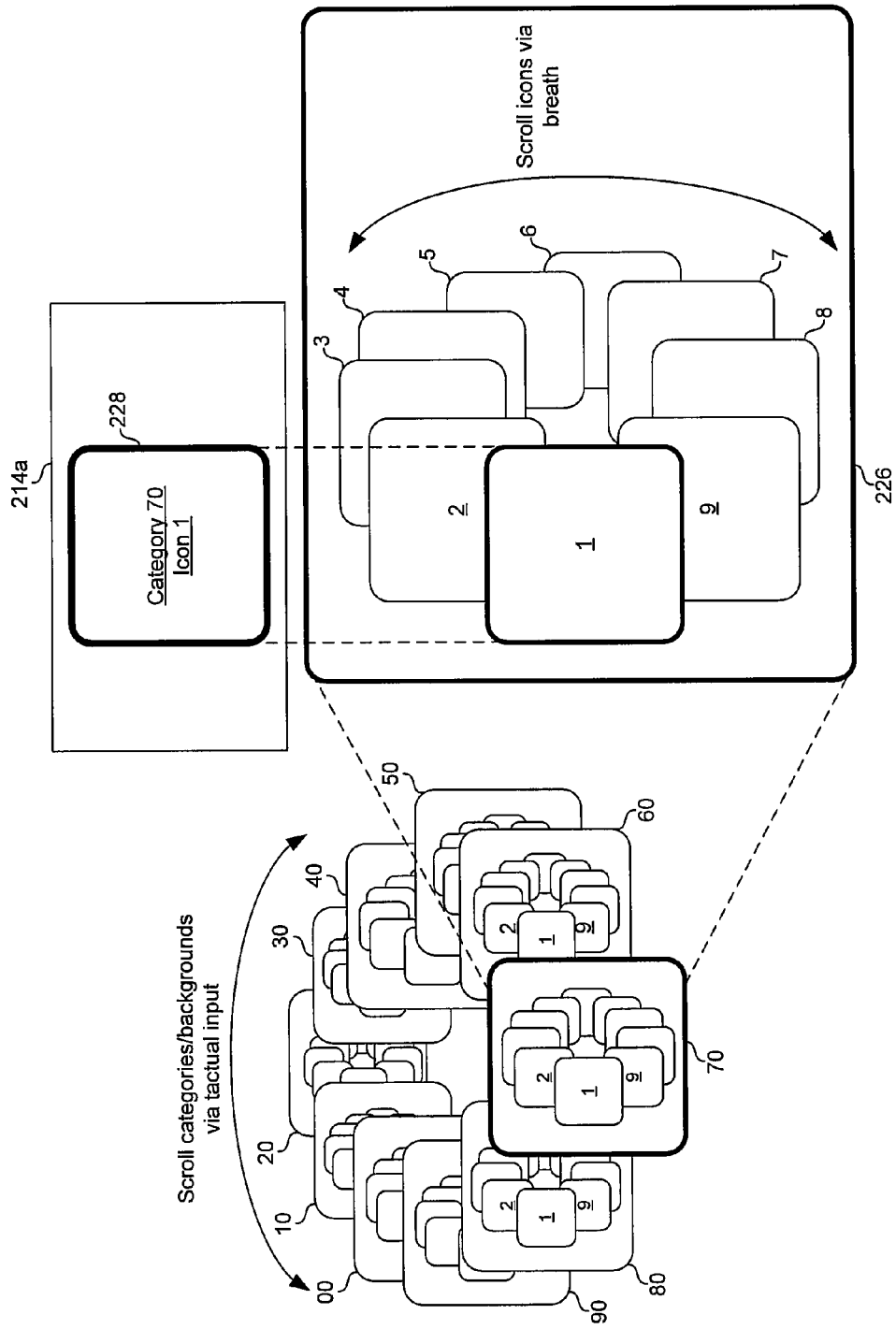
FIG. 2E illustrates interacting with a sectional user interface of an electronic device via respiratory and tactual input, in accordance with an embodiment of the invention.

FIG. 2E illustrates interacting with a sectional user interface of an electronic device via respiratory and tactual input, in accordance with an embodiment of the invention. Referring to FIG. 2E there is shown a control region 214a which may comprise an active icon area 228. The control region 214a depicted in FIG. 2E is an exemplary configuration of the control region 214 and the invention is not limited to the depicted embodiment. In various embodiments of the invention, icons may be represented in a variety of ways and may comprise visual information such as images and/or text and/or may comprise audio information such as tones, songs, and/or speech.

The active icon area 228 may determine, at least in part, the information displayed in a content region 218 as well as how an electronic device 202 may respond to a tactual and/or respiratory input. In this regard, a content region 218, as described with respect to FIGS. 2A and 2D, may display information corresponding to the icon that is in the active icon area 228. Furthermore, upon a "click", (e.g., a touchscreen tap, a button press or puff of air) an application or function associated with the icon in the active icon area 228 may be launched.

In various embodiments of the invention, icons may be grouped categorically and each category may comprise one or more icons. In this regard, the number of categories and/or the number of icons in each category may be configured by a user. In this regard, in the exemplary embodiment depicted in FIG. 2E, there are ten categories, categories 00, 10, ..., 90, and each category comprises nine icons, icons 1, 2, ..., 9. Exemplary categories may comprise phone and messaging, news, multimedia, music, photos, and videos. Additionally, information and/or objects displayed in the fixed zone 210 may be determined based on which category is active.

In various embodiments of the invention, each icon may comprise descriptive text, image(s) and/or audio, configurable by a user, to indicate which functions and/or applications may be associated with the icon.

In various embodiments of the invention, a background image, configurable by a user, of the display 204 may be associated with each category and may indicate which category is currently selected. In order to place a desired icon in the active icon area 228, a user may scroll between categories utilizing tactual and/or respiratory input and scroll between icons utilizing respiratory and/or tactual input. In this regard, the speed, direction, and/or duration of a scroll may be determined based on the type, duration, intensity, direction, and/or number of tactual and/or respiratory inputs.

In an exemplary embodiment of the invention, a user may scroll between categories utilizing tactual input and scroll between icons utilizing respiratory input. For example a user may scroll through the categories 00, 10, ..., 90 by shifting the position of his thumb in the control region 214 or by rolling a trackball; and the user may scroll through the icons in the active category 226 by exhaling. A user may scroll though categories until a background image displayed on the electronic device 202 corresponds to a desired category. A user may scroll through icons until the icon in the active icon area 228 corresponds to a desired function and/or application and/or results in desired information and/or objects in the content area 218.

Figure 2F:
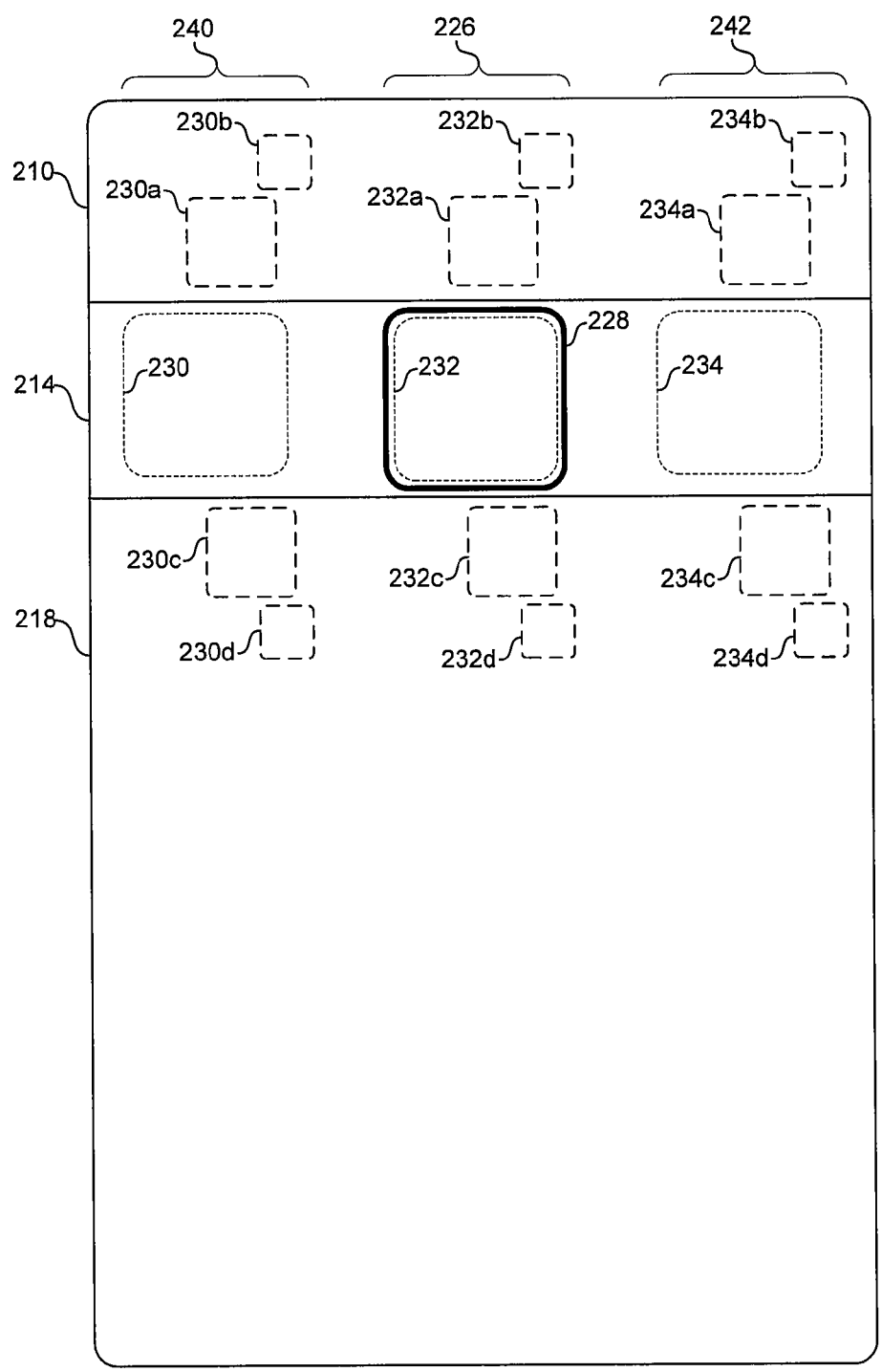
FIG. 2F illustrates an exemplary sectional user interface which may provide an indication of a sequence of categories and/or icons when scrolling, in accordance with an embodiment of the invention.

FIG. 2F illustrates an exemplary sectional user interface which may provide an indication of a sequence of categories and/or icons when scrolling. In this regard, the icons and/or categories may scroll in a linear manner in which there are first (e.g., leftmost or top) and last (e.g., rightmost or bottom) icons and/or categories. Alternatively, icons and/or categories may scroll in a cyclical manner in which all icons and/or categories may be accessed by scrolling in either direction regardless of which icon and/or category is active at the beginning of the scroll. Notwithstanding the manner in which icons and/or categories scroll, it may be desirable to provide a user with an indication of next and/or previous icons and/or categories in a scrolling sequence. Accordingly, various aspects of the invention may enable displaying an indication of next and/or previous icons and/or categories in the fixed region 210, the control region 214, and/or the content region 218. In this regard, the indication may enable a user to determine which direction to scroll icons and/or categories to reach a desired icon and/or category in a fastest and/or most efficient manner. For example, a portion(s) of the fixed region 210, the control region 214 and/or the content region 218 may be overlaid by semi-transparent image(s) of the next icon(s) and/or category/categories in the scrolling sequence. In this regard, the semi-transparency may be sufficiently opaque for a user to identify the next and/or previous icon(s) and/or category/categories and sufficiently transparent so that the information in the fixed region 210 and in the content region 218 may not be critically obstructed.

In the exemplary embodiment of the invention depicted in FIG. 2F, icons and categories may be scrolled in a "pinwheel" or "slot machine" fashion. In this regard, semi-transparent images of a two previous icon 230b, a one previous icon 230a, current icon 230, a one next icon 230c, and a two next icon 230d of a one previous category 240 may be overlaid on the user interface. Similarly, semi-transparent images of a two previous icon 232b, a one previous icon 232a, current icon 232, a one next icon 232c, and a two next icon 232d of the active category 226 may be overlaid on the user interface.

Similarly, semi-transparent images of a two previous icon 234b, a one previous icon 234a, current icon 234, a one next icon 234c, and a two next icon 234d of a one next category 242 may be overlaid on the user interface.

Figure 2G:
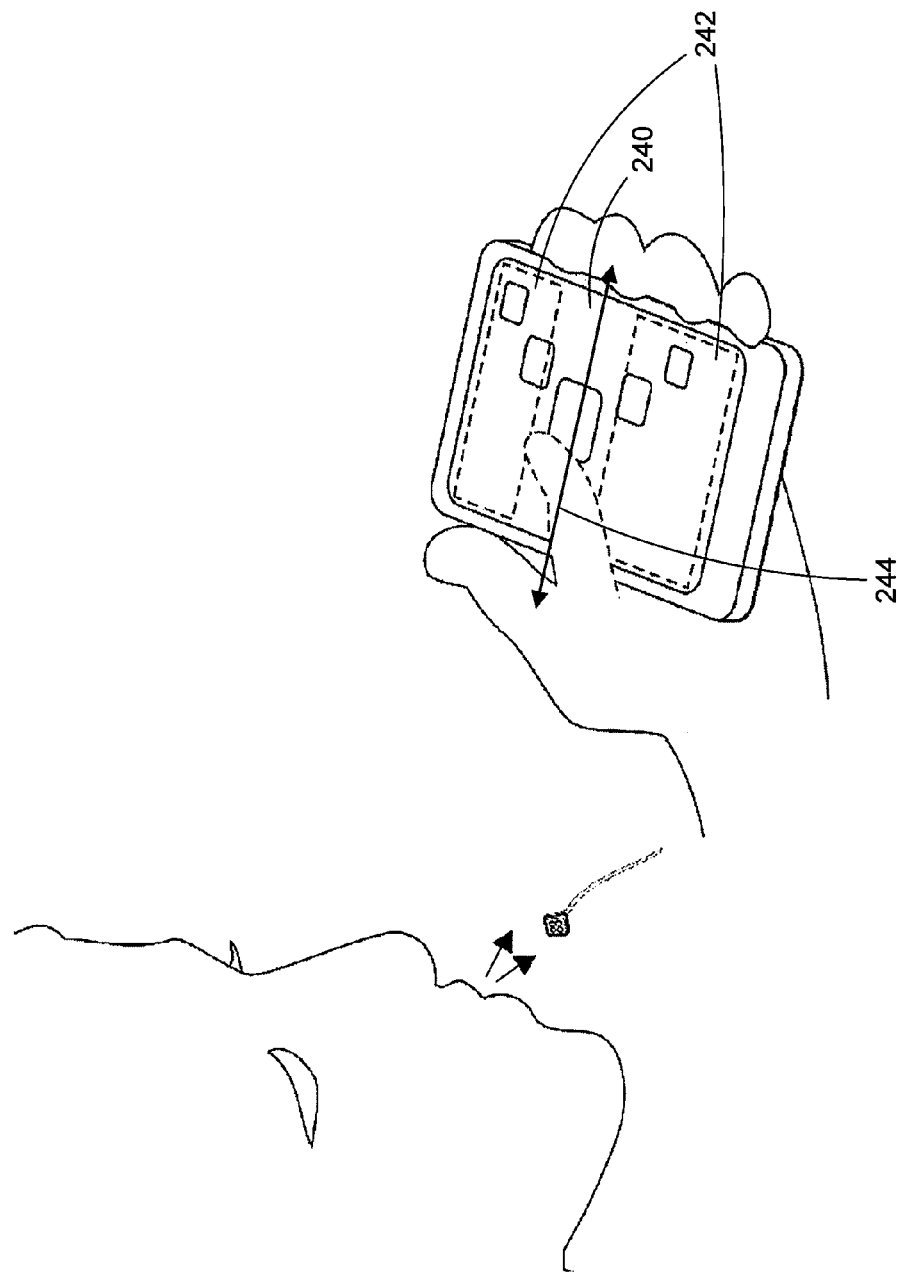
FIG. 2G illustrates interacting with an exemplary sectional user interface via respiratory and tactual input, in accordance with an embodiment of the invention.

FIG. 2G illustrates interacting with an exemplary sectional user interface via respiratory and tactual input, in accordance with an embodiment of the invention. Referring to FIG. 2G there is shown a user interacting with an exemplary sectional user interface via tactual and respiratory input.

The region 240 of the user interface may be a control region and may display elements which may be displaced by respiratory input and selected by a thumb tap in the region 240. The arrow 244 in FIG. 2G is utilized to illustrate that categories of icons may be scrolled via thumb shifting (i.e. a slight drag of the thumb) in the region 240.

Information and/or objects displayed in the regions 242 may be superimposed transparencies that allow a user to see the previews of the next and previous icons. The information and/or objects displayed in the regions 242 may be fixed or may change and/or update. Some objects displayed in the regions 242 may be selectable via a thumb tap.

Thus, due to the combination of respiratory and tactual inputs and the clearly defined responses to those inputs, the sectional user interface comprising the regions 240 and 242 may provide a disambiguated solution compared to conventional user interfaces. In this regard, the sectional user interface may enables configurable (i.e. customized or personalized) and predictable control of an electronic device and multi-layered and/or multi-dimensional display of content.

Figure 2H:
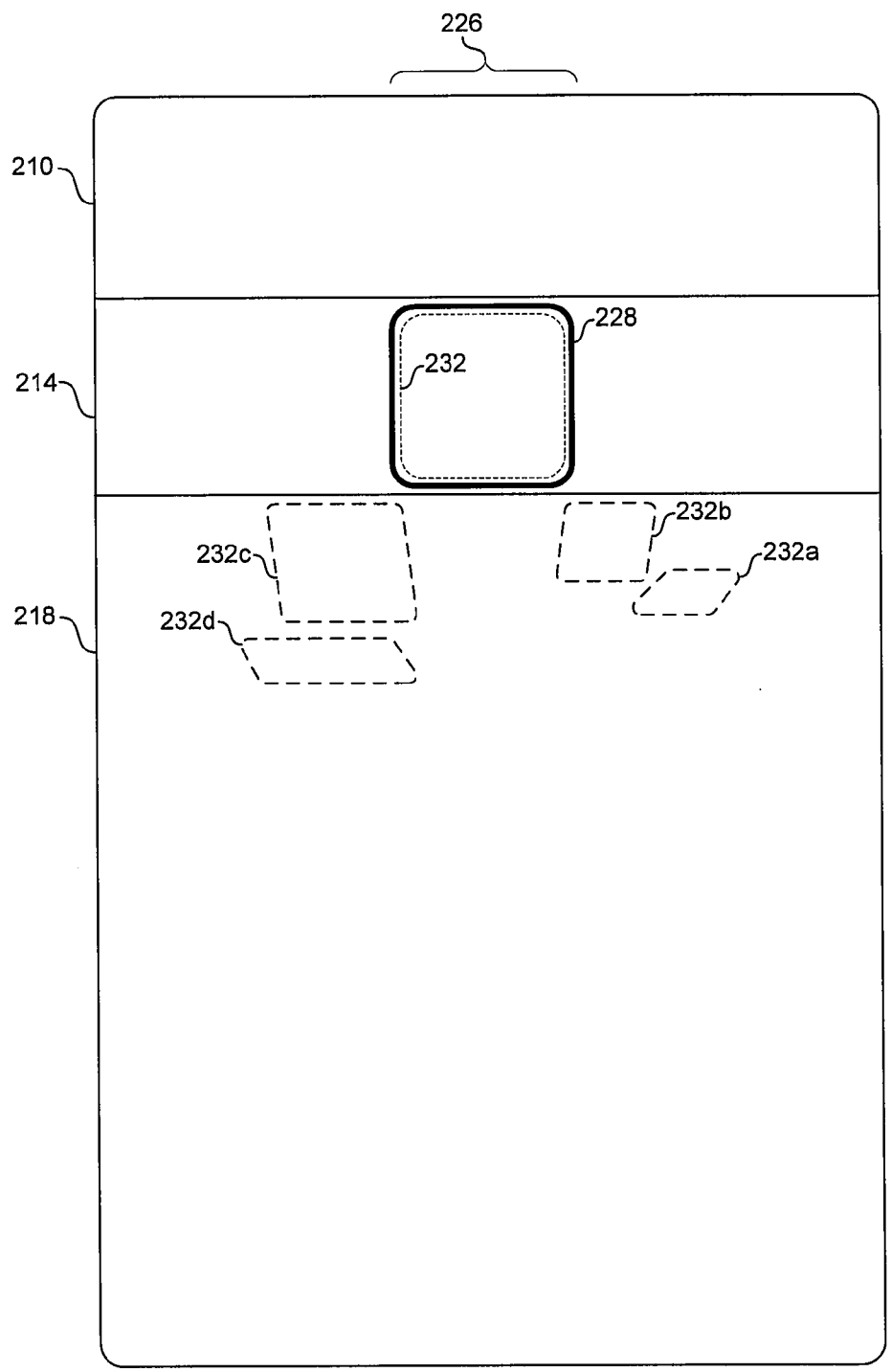
FIG. 2H illustrates another exemplary sectional user interface which may provide an indication of a sequence of categories and/or icons when scrolling, in accordance with an embodiment of the invention.

FIG. 2H illustrates another exemplary sectional user interface which may provide an indication of a sequence of categories and/or icons when scrolling. In the exemplary embodiment of the invention depicted in FIG. 2H, icons and categories may be scrolled in a "flipbook" fashion. In this regard, semi-transparent images of a two previous icon 232b, a one previous icon 232a, current icon 232, a one next icon 232c, and a two next icon 232d of the active category 226 may be overlaid on the user interface.

FIG. 3 illustrates launching an application via a user interface utilizing tactual and respiratory input, in accordance with an embodiment of the invention. Referring to FIG. 3 there is shown exemplary screen shots 310a, 310b, 310c, and 310d which depict an exemplary sequence of actions to navigate to a desired icon and launch an application associated with that icon.

The sequence of actions may begin with the electronic device 202 in the state depicted by screenshot 310a. In this regard, in screenshot 310a, an icon 302 may be in the active icon area 228 of the control region 214a. Accordingly, the background image of diagonal stripes may correspond to the category to which the icon 302 may belong. Additionally, the objects $302_1, \ldots, 302_4$ in the content region 218a may correspond to the icon 302.

Subsequently, a user may scroll through a sequence of categories via a tactual movement such as a thumb shift or a roll of a trackball. In this regard, the user may seek a category associated with a background image of dots. Accordingly, when the user arrives at the background image of dots the device may be in the state depicted in screenshot 310b. In the screenshot 310b, an icon 304 may be in the active icon area 228 of the control region 214b and the objects $304_1, \ldots, 304_N$ in the content region 218b may correspond to the icon 304.

Subsequently, a user may scroll through the icons in the category with the background image of dots via a respiratory input such as one or more exhalations. In this regard, the user may scroll through a sequence of icons until the device is in the state depicted in the screenshot 310c. In the screenshot 310c, an icon 306, corresponding to a desired function or application, may be in the active icon area 228 of the control region 214c. Accordingly, the objects $306_1, \ldots, 306_N$ in the content region 318c may correspond to the icon 306.

In this manner, in the screenshot 310c, the user may have arrived at his desired icon, icon 306, and may launch the desired application and/or function by selecting the icon 306 via a tactual input such as a tap of a touchscreen or a button press. In the exemplary embodiment of the invention depicted in FIG. 310d, a web page may be associated with the icon 306 and upon selecting the icon 306, a web browser may launch and a web page may be displayed full-screen as depicted in the screenshot 310d.

FIG. 4A illustrates exemplary interaction with an application running on a electronic device, in accordance with an embodiment of the invention. Referring to FIG. 4A, aspects of the invention may enable zooming in (enlarging) and/or zooming out (shrinking) via a combination of respiratory and tactual inputs. For example, a web browser running on the electronic device 202 may be displaying a full webpage 422 and a user may wish to zoom in on a portion 424 of the webpage. Accordingly, the user may utilize a tactual input to control a reference point(s) for the zoom and utilize a respiratory input to control the direction and/or amount of zoom. For example, the user may touch the reference point on a touchscreen and may zoom in or out based on that reference point by exhaling. In this regard, the direction and/or amount of zoom may be controlled by, for example, the intensity, duration, direction, and/or number of exhalations.

FIG. 4B illustrates interaction with an application running on an electronic device, in accordance with an embodiment of the invention. Referring to FIG. 4B, aspects of the invention may enable scrolling via a combination of respiratory and tactual inputs. Exemplary applications may comprise a web browser, a media player, a still camera, a video camera, and a file system browser. For example, a web browser may be displaying a portion of a webpage 424 and a user may wish to scroll to another portion 428 of the webpage. Accordingly, the user may utilize a respiratory input to perform a coarse scroll and utilize a tactual input to perform a fine scroll. For example, the user may exhale in the direction he wishes to scroll to arrive at the portion 426 of the webpage and then finely adjust the position of the webpage via a roll of a trackball such that the portion 428 of the webpage is displayed.

Figure 5:
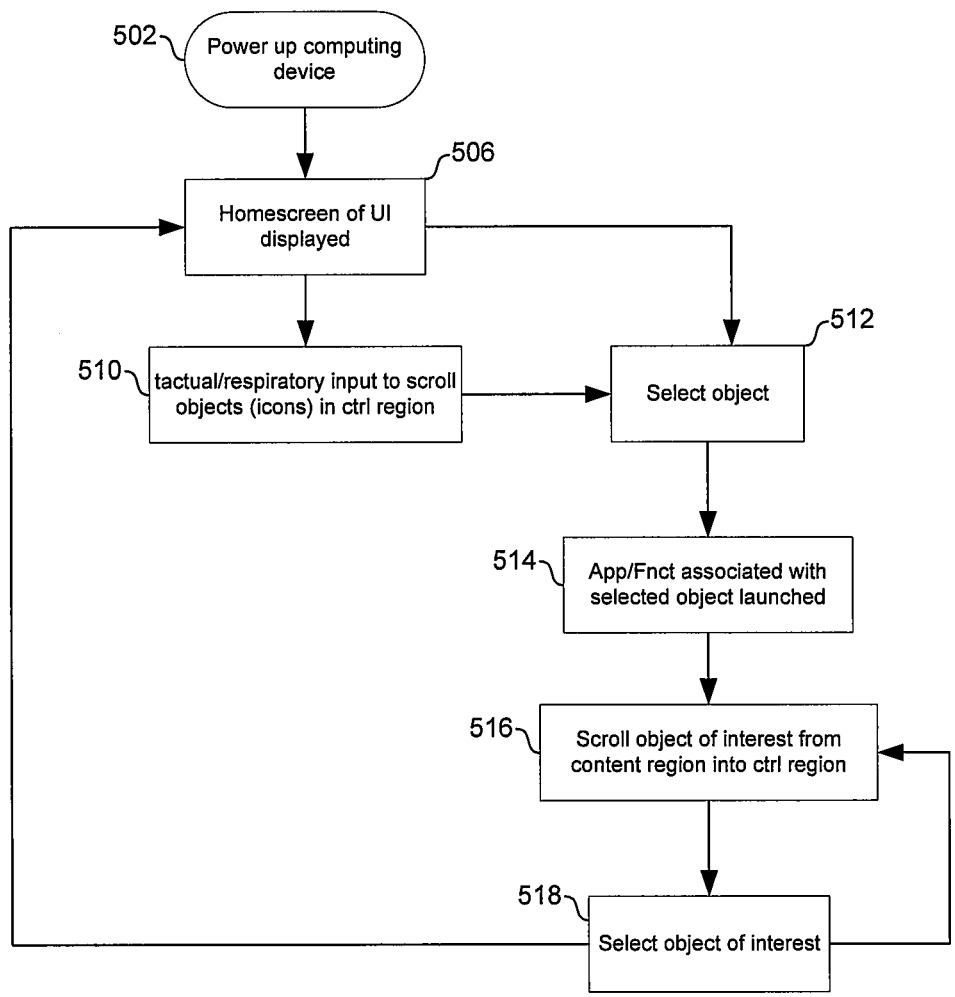
FIG. 5 is a flow chart illustrating exemplary steps of interfacing with a electronic device via a sectional user interface utilizing respiratory and tactual input, in accordance with an embodiment of the invention.

FIG. 5 is a flow chart illustrating exemplary steps of interfacing with an electronic device via a sectional user interface utilizing respiratory and tactual input, in accordance with an embodiment of the invention. Referring to FIG. 5 the exemplary steps may begin with step 502 when the electronic device 202 may be powered on. Subsequent to step 502, the exemplary steps may advance to step 506. In step 506, a homescreen of the user interface may be displayed. In this regard, objects of the homescreen in the fixed region 210, the control region 214, and/or the content region 218 may be configured by a user. From the homescreen, the user may select or navigate to an object of interest. In instances that an object of interest may be displayed, the exemplary steps may advance to step 512.

In step 512 an object of interest may be selected utilizing tactual and/or respiratory input. Factors such as intensity, duration, number of and/or direction of the touch and/or the expulsion of air may be utilized by the user interface to determine the intentions of the user. For example, tactual input to select an object may comprise a quick tap of the object on a touchscreen and respiratory input to select an object may comprise a short exhalation. Subsequent to step 512, the exemplary steps may advance to step 514.

In step 514, an application and/or function associated with the object selected in step 512 may be launched. For example, an application and/or function such as phone, text messaging, web browser, email client, or calendar may be launched. In this regard, an application may take up all of the fixed region 210, control region 214, and/or content region 218, or an application may take up only a portion of the fixed region 210, control region 214, and/or content region 218. Subsequent to step 514, the exemplary steps may advance to step 516.

In step 516, a user may interact with an application or function launched in steps 514 and/or 518. In this regard, a user may scroll objects from the content region 218 into the control region 214 via respiratory and/or tactual input. Once an object of interest is in the control region 214, the exemplary steps may advance to step 518.

In step 518, an object of interest in the control region 214 may be selected. In some instances, this selection may result in new objects and/or information displayed in the content region 218. In this manner, interaction with the user interface may be hierarchal. For example, each selection of an object in the control region 214 may effect a change in the objects in the content region 218. In some instances, the selection in step 516 may result in closing an application and/or function launched in steps 514 and/or 518 and the exemplary steps may return to step 506. In some instances the selection in step 516 may result in launching another application and/or function and the exemplary steps may return to step 516.

Returning to step 506, if an object of interest is not displayed in the homescreen, the exemplary steps may advance to step 510. In step 510, a user may utilize respiratory and/or tactual input to find an object of interest by scrolling through icons in the control region 214. In this regard, factors such as intensity, duration, number of, and/or direction of the touch and/or the exhalation may be utilized by the user interface to determine, for example, the direction, duration, and/or speed of a scroll. The user may scroll until an object of interest is displayed in the control region 214 and/or in the content region 218. Subsequent to step 506, the exemplary steps may advance to the previously described step 512.

Figure 6A:
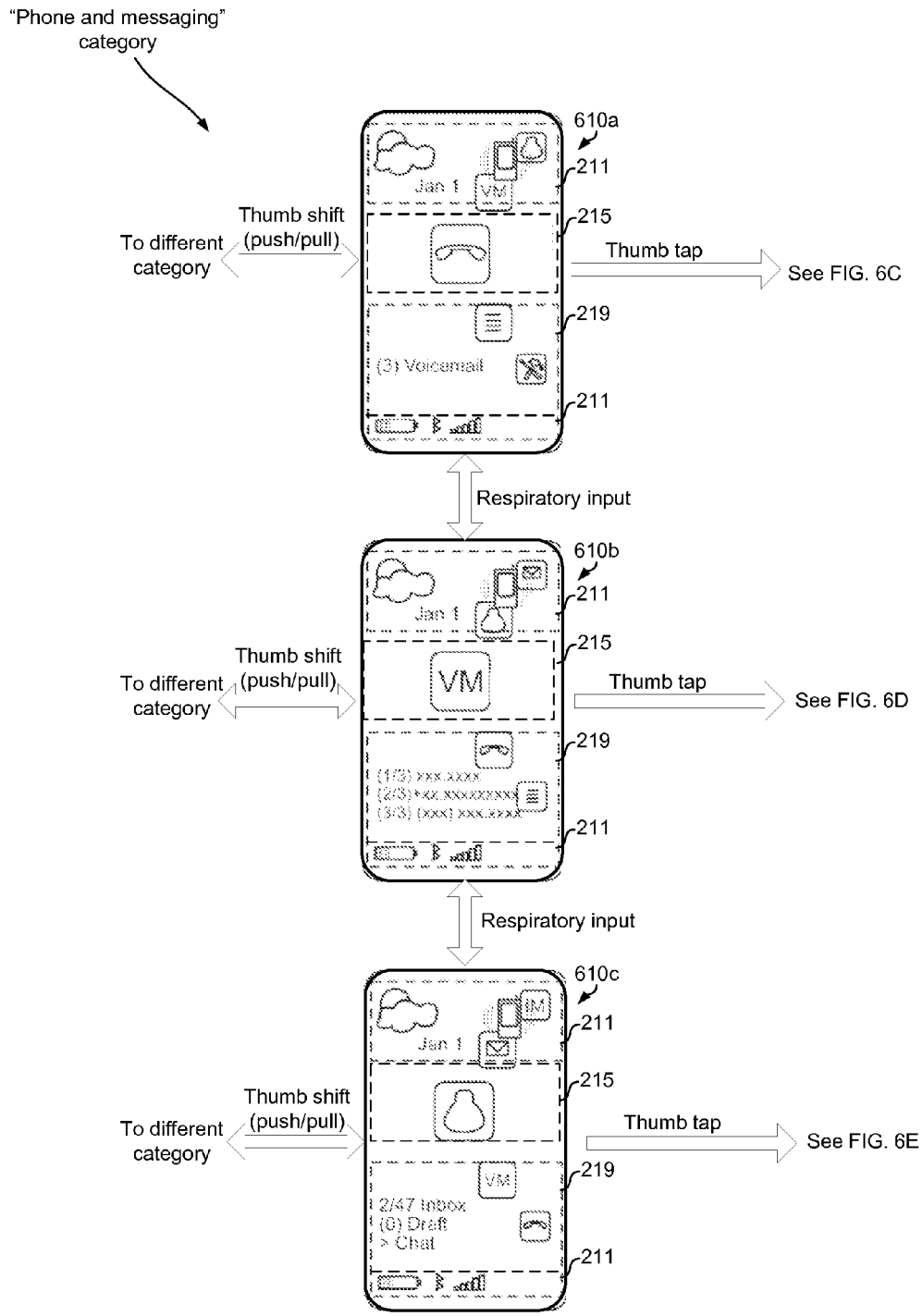
FIGS. 6A-6E illustrate an exemplary user interface of an electronic device, in accordance with an embodiment of the invention.

FIG. 6A illustrates an exemplary user interface of an electronic device, in accordance with an embodiment of the invention. Referring to FIG. 6A, screenshots of a "phone and messaging" category of an exemplary electronic device 202 are shown. In this regard, in the exemplary embodiment of the invention depicted, the homescreen of the user interface may be sectioned into two fixed zones 211, a control zone 215, and a content zone 219 when in the "phone and messaging category".

The screenshot 610a depicts a first fixed zone 211 comprising weather and date information; a second fixed zone 211 comprising battery strength, Bluetooth connectivity, and cellular signal strength; a control zone 215 comprising an icon corresponding to a phone function; and a content zone 219 displaying information associated with the phone function. In order to open the phone function, the user may tap the phone icon in the control zone 215 and the screenshots depicted in FIG. 6C may ensue. In instances that the user is not interested in launching the phone function, the user may utilize respiratory input to scroll to a different icon in the "phone and messaging" category, or may utilize a tactual input such as pushing or pulling his thumb across a portion of the control zone 215 to scroll to a different category.

The screenshot 610b depicts a first fixed zone 211 comprising weather and date information; a second fixed zone 211 comprising battery strength, Bluetooth connectivity, and cellular signal strength; a control zone 215 comprising an icon corresponding to a voicemail function; and a content zone 219 displaying information associated with the voicemail function. In order to listen and/or manage voicemails, the user may tap the voicemail icon and the screenshots depicted in FIG. 6D may ensue. In instances that the user is not interested in listening to or managing voicemails, the user may utilize respiratory input to scroll to a different icon in the "phone and messaging" category, or may utilize a tactual input such as pushing or pulling his thumb across a portion of the control zone 215 to scroll to a different category.

The screenshot 610c depicts a first fixed zone 211 comprising weather and date information; a second fixed zone 211 comprising battery strength, Bluetooth connectivity, and cellular signal strength; a control zone 215 comprising an icon corresponding to a contacts function, and a content zone 219 displaying information associated with the contacts function. In order to look-up and/or manage contacts, the user may tap the contacts icon and the screenshots depicted in FIG. 6E may ensue. In instances that the user is not interested in looking-up and/or managing contacts, the user may utilize respiratory input to scroll to a different icon in the "phone and messaging" category, or may utilize a tactual input such as pushing or pulling his thumb across a portion of the control zone 215 to scroll to a different category.

Figure 6B:
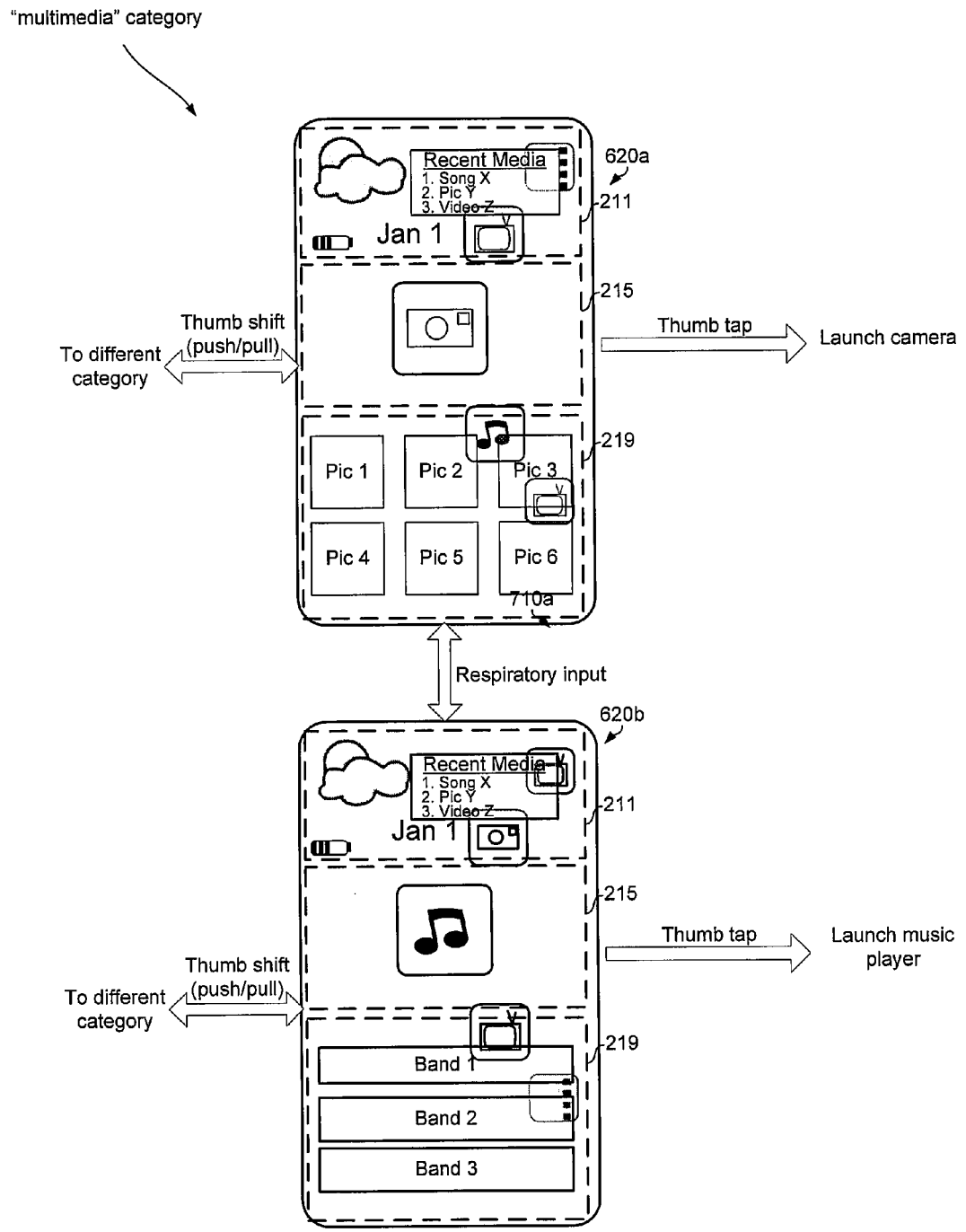

FIG. 6B illustrates an exemplary user interface of an electronic device, in accordance with an embodiment of the invention. Referring to FIG. 6B, screenshots of a "multimedia" category of an exemplary electronic device 202 are shown. In this regard, in the exemplary embodiment of the invention depicted, the homescreen of the user interface may be sectioned into a fixed zone 211, a control zone 215, and a content zone 219 when in the "multimedia" category.

The screenshot 620a depicts a fixed zone 211 comprising battery, weather, and date information; a control zone 215 comprising an icon corresponding to a camera function; and a content zone 219 displaying information associated with the camera function. In order to open the phone function, the user may tap the camera icon. In instances that the user is not interested in launching the camera function, the user may utilize respiratory input to scroll to a different icon in the "multimedia" category, or may utilize a tactual input such as pushing or pulling his thumb across a portion of the control zone 215 to scroll to a different category.

The screenshot 620b depicts a fixed zone 211 comprising battery, weather, and date information; a control zone 215 comprising an icon corresponding to a music player function; and a content zone 219 displaying information associated with the music player function. In order to open the music player function, the user may tap the music player icon. In instances that the user is not interested in launching the music player function, the user may utilize respiratory input to scroll to a different icon in the "multimedia" category, or may utilize a tactual input such as pushing or pulling his thumb across a portion of the control zone 215 to scroll to a different category.

Figure 6C:
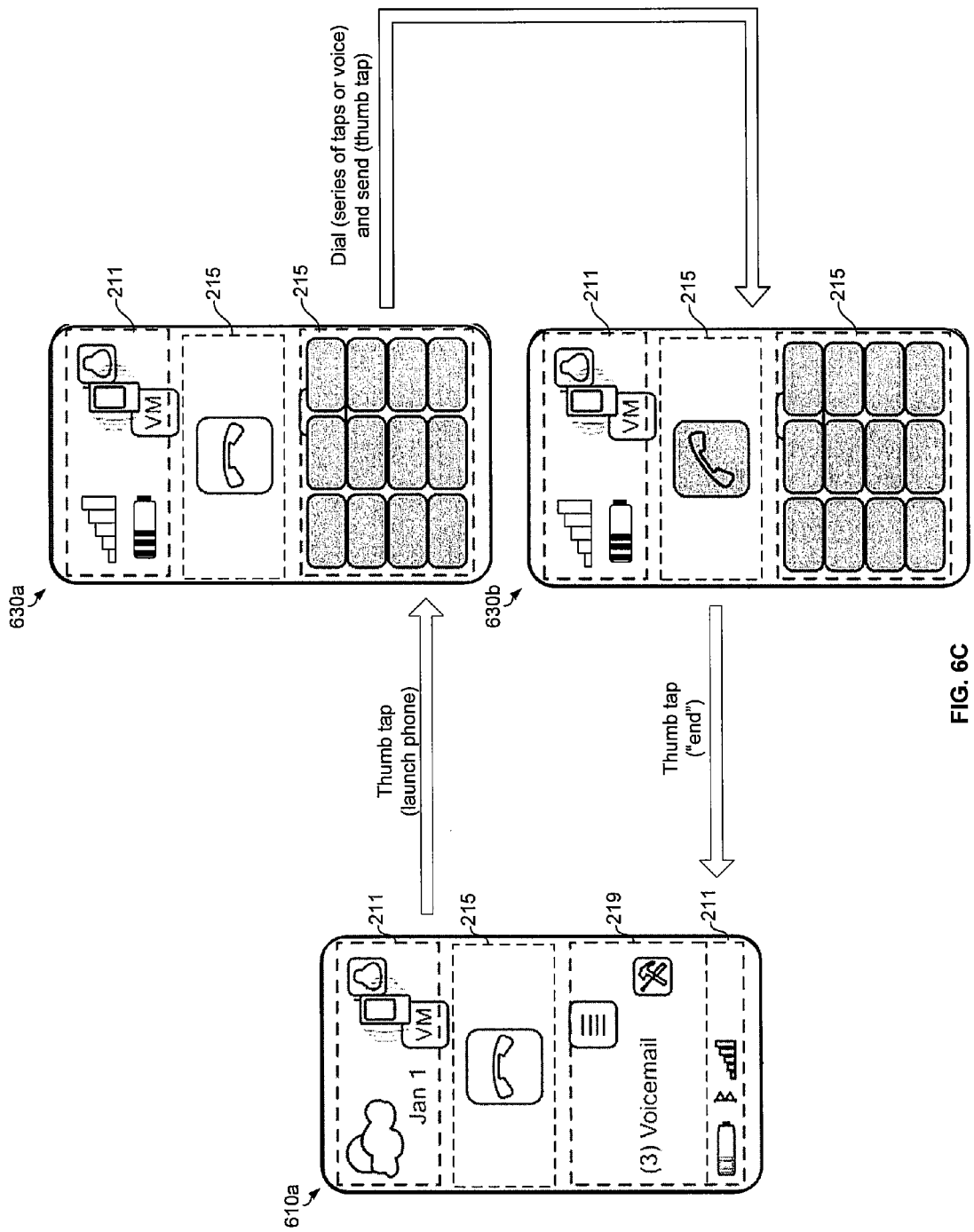

FIG. 6C illustrates an exemplary user interface of an electronic device, in accordance with an embodiment of the invention. Referring to FIG. 6C, screenshots of a phone function of an exemplary electronic device 202 are shown.

The screenshot 630a depicts a fixed zone 211 comprising battery and signal strength information, a first control zone 215 comprising a "talk/end" icon, having an image of a phone indicating there is no call in progress, and a second control zone 215 comprising a keypad. The user may dial a phone number utilizing the keypad, or utilizing voice recognition and may subsequently tap "talk/end" to place the call.

In the screenshot 630b, a call may be in progress and the image of the "talk/end" icon may indicate a call in progress.

Upon completion of the call, the user may tap the "talk/end" icon to disconnect the call and return to the homescreen (screenshot 610a).

Figure 6D:
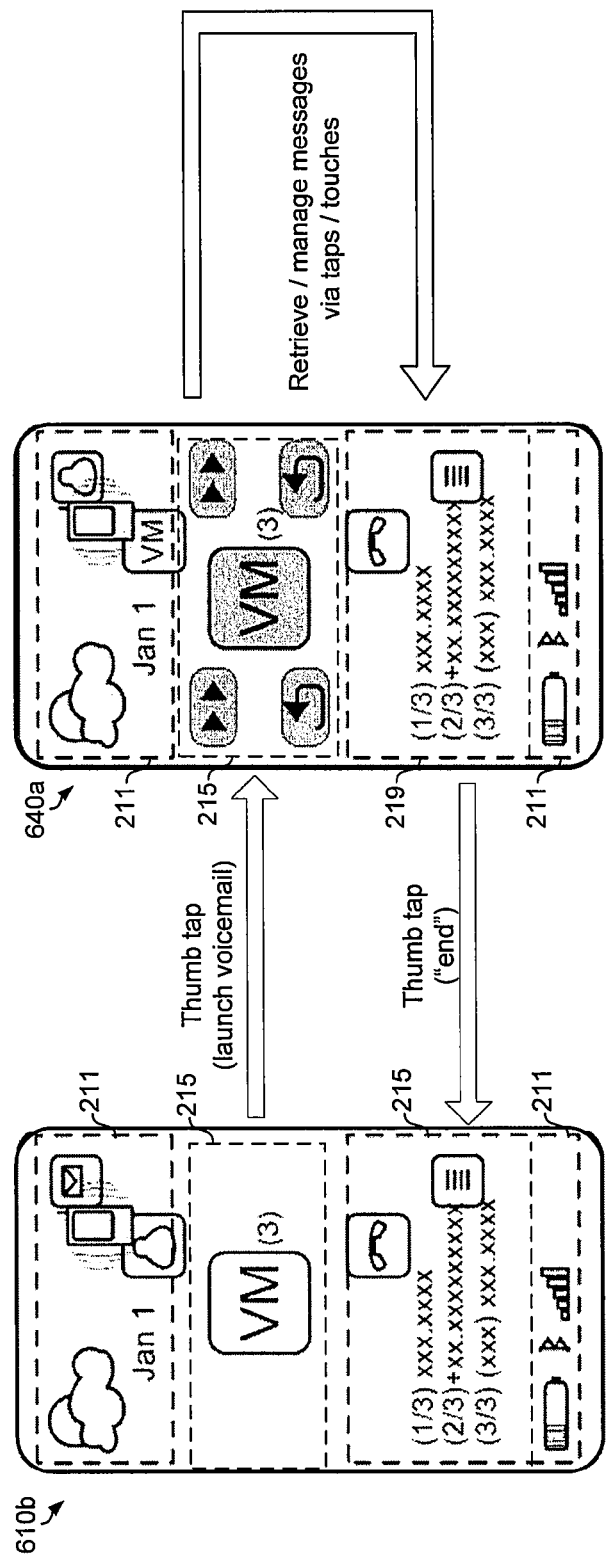

FIG. 6D illustrates an exemplary user interface of an electronic device, in accordance with an embodiment of the invention. Referring to FIG. 6D, screenshots of a voicemail function of an exemplary electronic device 202 are shown.

The screenshot 640a depicts a first fixed zone 211 comprising weather and date information; a second fixed zone 211 comprising battery strength, Bluetooth connectivity, and cellular signal strength; a control zone 215 comprising an icon for disconnecting from a voicemail system, and a plurality of icons for fast forwarding, rewinding, repeating, and skipping voicemails; and a content zone comprising information associated with the user's voicemails. When the user has finished listening to and/or managing the voicemails, the user may press the disconnect icon and the user interface may return to the homescreen (screenshot 610b).

Figure 6E:
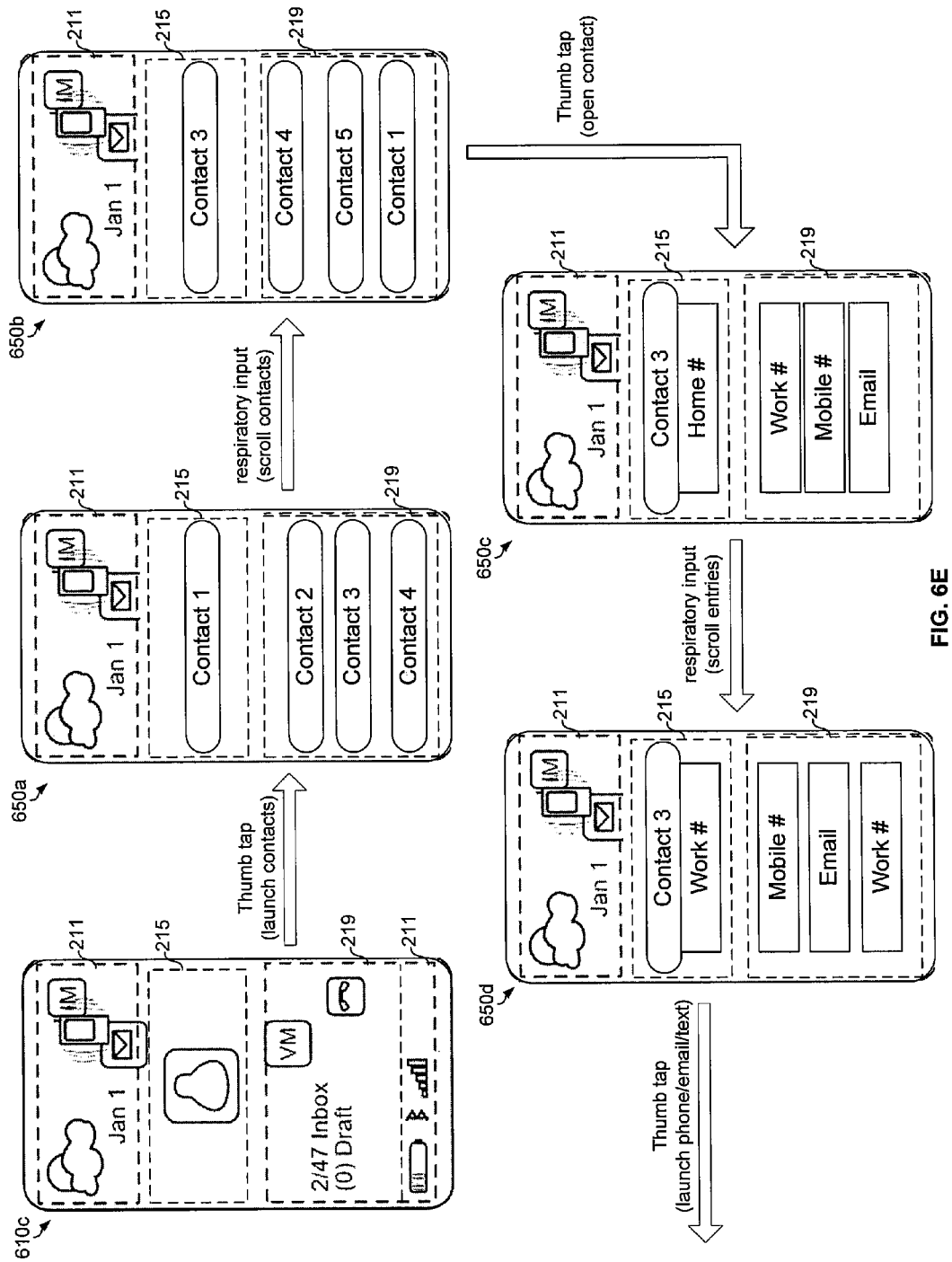

FIG. 6E illustrates an exemplary user interface of an electronic device, in accordance with an embodiment of the invention. Referring to FIG. 6E, screenshots of a contacts function of an exemplary electronic device 202 are shown.

The screenshot 650a depicts a fixed zone 211 comprising weather and date information, a control zone 215 comprising an object corresponding to "contact 1", and a content zone 219 comprising objects corresponding to the next three contacts in the user's contact list. In the exemplary embodiment of the invention depicted, the user may desire information for "contact 3" and thus may utilize respiratory input to scroll the "contact 3" object from the content zone 219 into the control zone 215, as depicted in screenshot 650b. Subsequently, the user may tap the "contact 3" object to view entries corresponding to "contact 3", as shown in screenshot 650c. In the exemplary embodiment of the invention depicted, upon tapping the "contact 3" object, the home phone number for "contact 3" may be displayed in the control zone. In this regard, the home number may be the default contact method for "contact 3", as configured by the user. In instances that the user wants to reach contact 3 via a method other than the home phone number, the user may utilize respiratory input to scroll to other entries for "contact 3". In the exemplary embodiment of the invention depicted, the user may scroll to the "contact 3 work #" object, as depicted in screenshot 650d. Subsequently, the user may tap the "contact 3 work #" object to launch the phone function and call "contact 3" at the work phone number. Similarly, if the user desired to email "contact 3", the user may utilize respiratory input to scroll to the "contact 3 email" object and tap the "contact 3 email" object to launch an email function on the electronic device 202.

Aspects of a method and system for interfacing with an electronic device 202 via respiratory and tactual input are provided. In this regard, respiratory and tactual input may be utilized to interact with the electronic device 202 via a user interface. The user interface may comprise a control region 214, a fixed region 210, and a content region 218. The control region 214 may enable navigating and selecting objects, such as icons. The fixed region 210 that may enable display of information that may be independent of a state of, or activity in, the control region 214. The content region 218 that may enable display or presentation of information that may depend on a state of, or activity in, the control region 214. Each of the regions 214, 210 and 218 of the user interface may comprise one or more zones, such as the zones 211, 215, and 219, and a size, shape, and/or location of each region may be customized based on user preferences and/or based on application(s) and/or function(s) being utilized on the electronic device. Objects displayed in the content region 218 may be scrolled into the control region via respiratory input.

The objects navigated and/or selected via the control zone 214 may be grouped into categories and each category may be associated with a background image. A user may utilize tactual input to scroll though the categories and may utilize respiratory input to scroll through the objects grouped into a particular category, such as the active category 226. Information, such as the webpage 424, displayed on the electronic device 202 may be coarsely scrolled via respiratory input and finely scrolled via tactual input. Similarly, information, such as the webpage 424, displayed on the electronic device 202 may be enlarged and/or shrunk by utilizing tactual input to control a reference point for the enlarging and/or shrinking and utilizing respiratory input to control an amount by which to enlarge and/or shrink the information. In various embodiments of the invention, the electronic device 202 may comprise one or more of a cellular telephone, a Smartphone, a wireless telephone, a notebook computer, a personal media player, a personal digital assistant, a multimedia device, a handheld device and/or a multi-function mobile device.

Another embodiment of the invention may provide a machine-readable storage, having stored thereon, a computer program having at least one code section executable by a machine, thereby causing the machine to perform the steps as described herein for interfacing with an electronic device via respiratory and/or tactual input.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for system control, the method comprising:
in an electronic device comprising a graphical user interface (GUI) displayed thereon, interfacing with said electronic device via said GUI utilizing at least a first mode of user input and a second mode of user input, the second mode of user input different from the first mode of user input, wherein said GUI of said electronic device comprises:
- a control region that permits user selection of a graphical object in said control region, using said first mode of user input, said graphical object moved to within said control region from outside of said control region using said second mode of user input, the graphical object representative of associated digital content or an associated application, wherein selection by said user of said graphical object within said control region initiates access to said associated digital content or said associated application on said electronic device;
- a fixed region that enables display of information that is independent of a state of, or activity in, said control region, wherein said fixed region is separate from said control region; and
- a content region that permits navigation or movement of the graphical object from said content region into said control region, but not selection of said graphical object in said content region, using said second mode of user input; and said user interface enables concurrently displaying said control region, said fixed region, and said content region.

2. The method according to claim 1, wherein said fixed region comprises one or more fixed zones, said control region comprises one or more control zones, and said content region comprises one or more content zones.

3. The method according to claim 1, wherein said applications on said electronic device are grouped into a plurality of categories.

4. The method according to claim 3, wherein each category of said plurality of categories is associated with a corresponding background image of a plurality of background images, and wherein said corresponding background image of said plurality of background images for a category of a particular application is displayed in said content region when said particular application is navigated to but not selected in said control region.

5. The method according to claim 3, comprising navigating said applications on said electronic device by scrolling through said categories via said first mode of user input and scrolling through said applications grouped into a particular category via said second mode of user input.

6. The method according to claim 1, wherein one or more of a size, a shape, and a location of said control region is configurable by a user.

7. The method according to claim 1, wherein one or more of a size, a shape, and a location of said fixed region is configurable by a user.

8. The method according to claim 1, wherein one or more of a size, a shape, and a location of said content region is configurable by a user.

9. The method according to claim 1, comprising scrolling information displayed on said electronic device via said second mode of user input and scrolling information displayed on said electronic device via said first mode of user input.

10. The method according to claim 1, comprising enlarging and/or shrinking information displayed on said electronic device via said first mode of user input and/or said second mode of said user input, wherein a reference point for said enlarging and/or shrinking is selected via said first mode of user input and an amount by which said information is enlarged and/or shrunk is controlled via said second mode of user input.

11. The method according to claim 1, wherein one or more of a size, a shape, and a location of said fixed region, said control region, and/or said content region depends on an application and/or function being utilized on said electronic device.

12. The method according to claim 1, wherein said electronic device may comprise one or more of a phone, a notebook computer, a personal media player, a personal digital assistant, and/or a multi-function mobile device.

13. A non-transitory machine-readable storage having stored thereon, a computer program having at least one code section for system control, the at least one code section being executable by a machine for causing the machine to perform steps comprising:

in an electronic device comprising a graphical user interface (GUI) displayed thereon, interfacing with said electronic device via said GUI utilizing at least a first mode of user input and a second mode of user input, wherein said GUI of said electronic device comprises:
- a control region that permits user selection of a graphical object in said control region, using said first mode of user input, said graphical object moved to within said control region from outside of said control region using said second mode of user input, the graphical object representative of associated digital content or an associated application, wherein selection by said user of said graphical object within said control region initiates access to said associated digital content or said associated application on said electronic device;
- a fixed region that enables display of information that is independent of a state of, or activity in, said control region, wherein said fixed region is separate from said control region; and
- a content region that permits navigation or movement of the graphical object from said content region into said control region, but not selection of said graphical object in said content region, using said second mode of user input; and said user interface enables concurrently displaying said control region, said fixed region, and said content region.

14. The non-transitory machine-readable storage according to claim 13, wherein said fixed region comprises one or more fixed zones, said control region comprises one or more control zones, and said content region comprises one or more content zones.

15. The non-transitory machine-readable storage according to claim 13, wherein said applications on said electronic device are grouped into a plurality of categories.

16. The non-transitory machine-readable storage according to claim 15, wherein each category of said plurality of categories is associated with a corresponding background image of a plurality of background images, and wherein said corresponding background image of said plurality of background images for a category of a particular application is displayed in said content region when said particular application is navigated to but not selected in said control region.

17. The non-transitory machine-readable storage according to claim 15, wherein said at least one code section comprises code for navigating said applications on said electronic device by scrolling through said categories via said first mode of user input and scrolling through said applications grouped into a particular category via said second mode of user input.

18. The non-transitory machine-readable storage according to claim 13, wherein one or more of a size, a shape, and a location of said control region is configurable by a user.

19. The non-transitory machine-readable storage according to claim 13, wherein one or more of a size, a shape, and a location of said fixed region is configurable by a user.

20. The non-transitory machine-readable storage according to claim 13, wherein one or more of a size, a shape, and a location of said content region is configurable by a user.

21. The non-transitory machine-readable storage according to claim 13, wherein said at least one code section comprises code for scrolling information displayed on said electronic device via said second mode of user input and scrolling information displayed on said electronic device via said first mode of user input.

22. The non-transitory machine-readable storage according to claim 13, wherein said at least one code section comprises code for enlarging and/or shrinking information displayed on said electronic device via said first mode of user and/or said second mode of user input, wherein a reference point for said enlarging and/or shrinking is selected via said first mode of user input and an amount by which said information is enlarged and/or shrunk is controlled via said second mode of user input.

23. The non-transitory machine-readable storage according to claim 13, wherein one or more of a size, a shape, and a location of said fixed region, said control region, and/or said content region depends on an application and/or function being utilized on said electronic device.

24. The non-transitory machine-readable storage according to claim 13, wherein said electronic device may comprise one or more of a phone, a notebook computer, a personal media player, a personal digital assistant, and/or a multi-function mobile device.

25. A control system comprising:
in an electronic device comprising a graphical user interface (GUI) displayed thereon, one or more processors that enable interfacing with said electronic device via said GUI utilizing at least a first mode of user input and a second mode of user input, wherein said GUI of said electronic device comprises:
a control region that permits user selection of a graphical object in said control region, using said first mode of user input, said graphical object moved to within said control region from outside of said control region using said second mode of user input, the graphical object representative of associated digital content or an associated application, wherein selection by said user of said graphical object within said control region initiates access to said associated digital content or said associated application on said electronic device;
a fixed region that enables display of information that is independent of a state of, or activity in, said control region, wherein said fixed region is separate from said control region; and
a content region that permits navigation or movement of the graphical object from said content region into said control region, but not selection of said graphical object in said content region, using said second mode of user input; and
said one or more processors enable displaying concurrently in said user interface, said control region, said fixed region, and said content region.

26. The control system according to claim 25, wherein said fixed region comprises one or more fixed zones, said control region comprises one or more control zones, and said content region comprises one or more content zones.

27. The control system according to claim 25, wherein said applications on said electronic device are grouped into a plurality of categories.

28. The control system according to claim 27, wherein each category of said plurality of categories is associated with a corresponding background image of a plurality of background images, and wherein said corresponding background image of said plurality of background images is displayed in said content region when a particular application is navigated to but not selected in said control region.

29. The control system according to claim 27, wherein said one or more processors enable navigating said applications on said electronic device by scrolling through said categories via said first mode of user input and scrolling through said applications grouped into a particular category via said second mode of said user input.

30. The control system according to claim 25, wherein one or more of a size, a shape, and a location of said control region is configurable by a user.

31. The control system according to claim 25, wherein one or more of a size, a shape, and a location of said fixed region is configurable by a user.

32. The control system according to claim 25, wherein one or more of a size, a shape, and a location of said content region is configurable by a user.

33. The control system according to claim 25, wherein said one or more processors enable scrolling information displayed on said electronic device via said second mode of user input and scrolling information displayed on said electronic device via said first mode of user input.

34. The control system according to claim 25, said one or more processors enable enlarging and/or shrinking information displayed on said electronic device via said first mode of user input and/or said second mode of user input, wherein a reference point for said enlarging and/or shrinking is selected via said first mode of user input and an amount by which said information is enlarged and/or shrunk is controlled via said second mode of user input.

35. The control system according to claim 25, wherein one or more of a size, a shape, and a location of said fixed region, said control region, and/or said content region depends on an application and/or function being utilized on said electronic device.

36. The control system according to claim 25, wherein said electronic device may comprise one or more of a phone, a notebook computer, a personal media player, a personal digital assistant, and/or a multi-function mobile device.

37. The method of claim 1, wherein said content region is separate from said control region.

38. The method of claim 1, wherein said first mode of user input is tactual input and said second mode of user input is respiratory input.

* * * * *